H. MEYER.
ELEVATING APPARATUS FOR MOTOR CARS.
APPLICATION FILED OCT. 30, 1914.

1,186,415.

Patented June 6, 1916.
2 SHEETS—SHEET 1.

Witnesses

Inventor
H. Meyer,
By Victor J. Evans
Attorney

H. MEYER.
ELEVATING APPARATUS FOR MOTOR CARS.
APPLICATION FILED OCT. 30, 1914.
1,186,415.
Patented June 6, 1916.
2 SHEETS—SHEET 2.
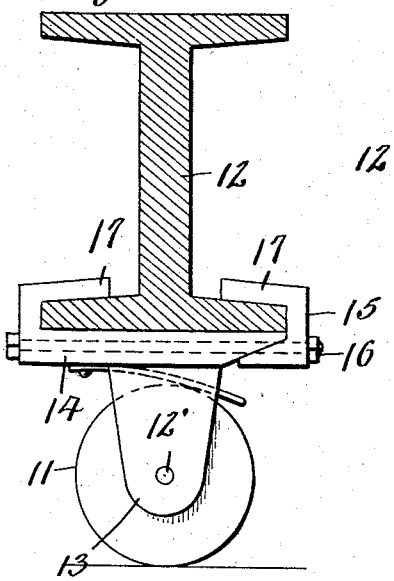
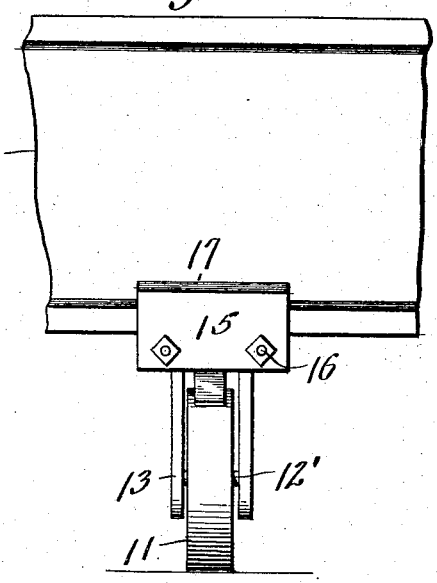
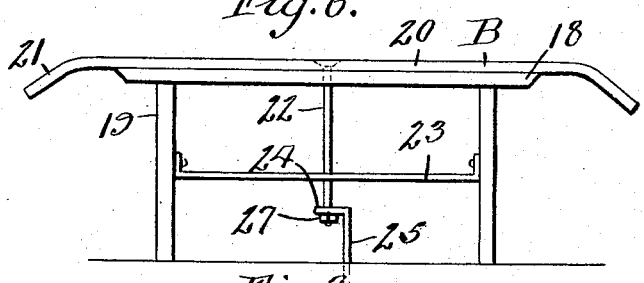
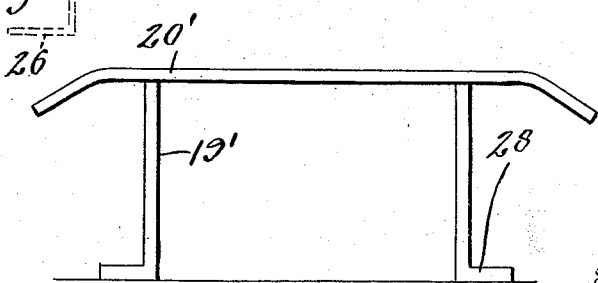
Inventor
H. Meyer,
By Victor J. Evans
Attorney
Witnesses

UNITED STATES PATENT OFFICE.

HENRY MEYER, OF RHINELAND, MISSOURI.

ELEVATING APPARATUS FOR MOTOR-CARS.

1,186,415.  Specification of Letters Patent.  Patented June 6, 1916.

Application filed October 30, 1914. Serial No. 869,465.

*To all whom it may concern:*

Be it known that I, HENRY MEYER, a citizen of the United States, residing at Rhineland, in the county of Montgomery and State of Missouri, have invented new and useful Improvements in Elevating Apparatus for Motor-Cars, of which the following is a specification.

This invention relates to elevating apparatus for motor cars, the object of the invention being to provide simple means whereby, for example, when the owner or driver of a motor car, propels his machine into the garage, the car will be automatically raised slightly but sufficiently to remove the load or weight from the pneumatic tires thus saving the tires and correspondingly increasing the life and durability thereof.

With the above and other objects in view, the invention consists in the novel construction, combination and arrangement of parts, as herein described, illustrated and claimed.

Figure 1:
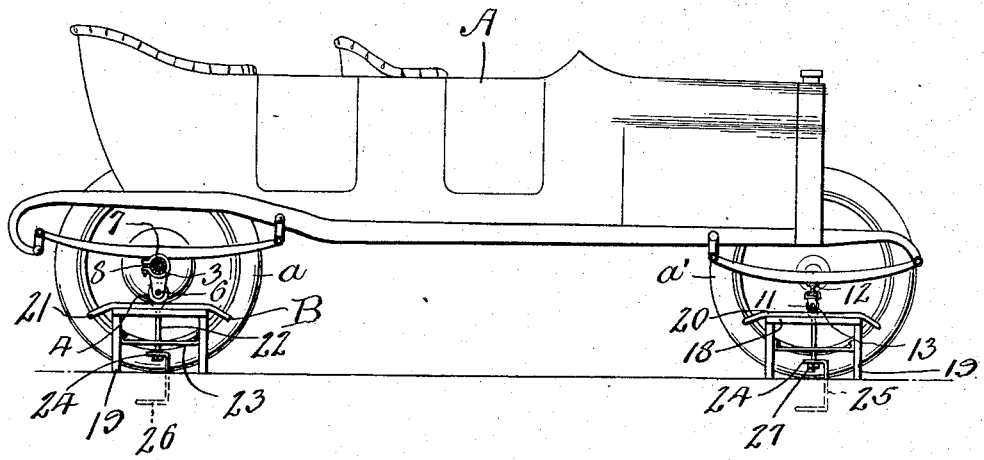
Figure 2:
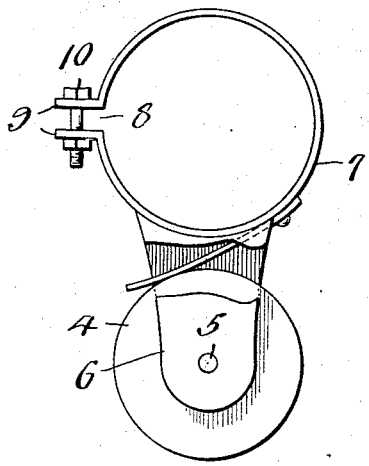
Figure 3:
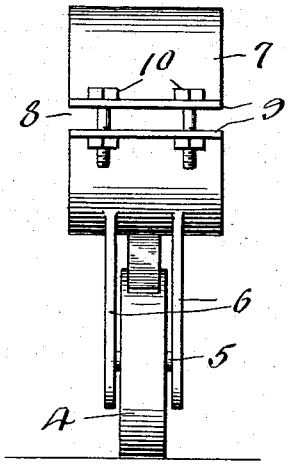

In the accompanying drawings: Figure 1 is a side elevation showing an automobile supported by the mechanism of this invention, the adjacent wheels of the automobile being omitted. Fig. 2 is an enlarged side elevation of one of the rear axle attachments. Fig. 3 is a view in elevation of the same. Fig. 4 is a side elevation of one of the front axle attachments showing the axle in cross section. Fig. 5 is a front elevation of the same. Fig. 6 is a side elevation of one of the elevating rests. Fig. 7 is a similar view showing a modified form of rest.

Referring to the drawings A designates generally an automobile or motor car which is conventionally shown, the same being provided with the rear wheels *a* and front wheels *a'*. On the rear axle housing 3 are mounted rollers 4, the latter being located by preference directly under the rear axle housing as shown in Fig. 1. Each of the rollers is journaled on a shaft or spindle 5 which is supported by a pair of ears 6 between which the roller 4 revolves, said ears 6 being formed on a band or strap 7 which is divided or split at 8 and provided with flanges 9 adjacent to the extremities of the band, said flanges being adapted to receive one or more clamping bolts 10 whereby the strap 7 may be confined tightly around the axle housing so as to prevent the same from turning. In like manner rollers 11 are mounted under the front axle 12 which is shown in the usual form of an I beam. Each of the rollers 11 is mounted on a shaft or spindle 12' carried by parallel ears 13 arranged in spaced relation to each other to receive the roller 11 between them. The ears 13 are formed on the main section 14 of a clip for engaging the bottom portion of the axle 12, the other section 15 of said clip being removably fastened to the section 14 by means of a through bolt 16 passing through both sections as shown in Fig. 4. Both sections 14 and 15 are provided with lips 17 which project over the bottom flange to the front axle thereby securely fastening the roller 11 in its proper position directly beneath the axle. It will be understood that two rollers 4 are fastened beneath the rear axle and a corresponding number of rollers 11 are fastened beneath the front axle. In connection with said rollers I employ stands one of which is designated generally at B. Each stand comprises a top rail 18 and legs 19 extending downwardly therefrom and adapted to rest upon the ground as indicated in Fig. 6. Supported upon the top rail 18 is a track rail 20 upon which one of the rollers 4 and 11 is adapted to travel, the opposite end portions of said rail being deflected downwardly as shown at 21 to facilitate the movement of the rollers onto and off the stand. The rail 20 is anchored in place by means of a bolt 22 the head of which is countersunk in the rail. Said bolt extends downwardly between the legs 19 through a combined guide and tie strap 23 which connects the legs 19. The lower end of the bolt 22 is inserted through the horizontally extending upper end portion 24 of an anchor 25 having a horizontally extended base portion 26 sunk and embedded in the ground. The lower portion of the bolt 22 is shown as threaded to receive a nut 27 on the under side of the portion 24 of the anchor 25. The construction referred to securely anchors the stand to the ground and fastens the rail 20 in place thereon.

Instead of the construction of stand illustrated in Fig. 6, the stand shown in Fig. 7 may be employed in which the rail 20' has the supporting legs 19' fastened directly thereto, said legs 19' being provided with laterally extending feet 28 which rest upon the ground and may be bolted or otherwise fastened to a floor or supporting surface.

From the foregoing description, taken in connection with the accompanying drawings it will now be understood that when the rollers, four in number, are fastened to the front and rear axles of a motor car in the manner shown and described, and the stands anchored to the floor or ground in a garage or other building, the rails 20 being located at a higher elevation than the bottoms of the rollers 4 and 11, the car when propelled upon said rails 20 will be elevated sufficiently to take the weight of the car and its load off the pneumatic tires, the downwardly deflected end portions 21 of the roller supporting rails facilitating the movement of the motor car upon and off said stand. In some cases it may be found desirable to provide pits 29 adjacent to the stand B in which case it will not be necessary to locate the roller supporting rails 20 at such a high elevation. The rails 20 may be high enough to remove the tires entirely from contact with the floor or ground but ordinarily it is only necessary to locate the rails 20 at a sufficient height to leave the tires in contact with the floor or ground but with the major portion of the weight removed therefrom.

What I claim is:—

Motor car elevating apparatus comprising rollers, means for fastening said rollers in fixed relation to the front and rear axles of the car, and stands upon which said rollers are adapted to run and be supported at such an elevation as to remove the load from the wheels of the car, said stands embodying rails on which said rollers are adapted to move, said rails having depressed end portions.

In testimony whereof I affix my signature in presence of two witnesses.

HENRY MEYER.

Witnesses:
BEN GOSEN,
A. R. THEISSEN.

Copies of this patent may be obtained for five cents each, by addressing the "Commissioner of Patents, Washington, D. C."